C. A. HIRTH.
SKIVING MACHINE.
APPLICATION FILED MAR. 31, 1911.
1,018,493.
Patented Feb. 27, 1912.
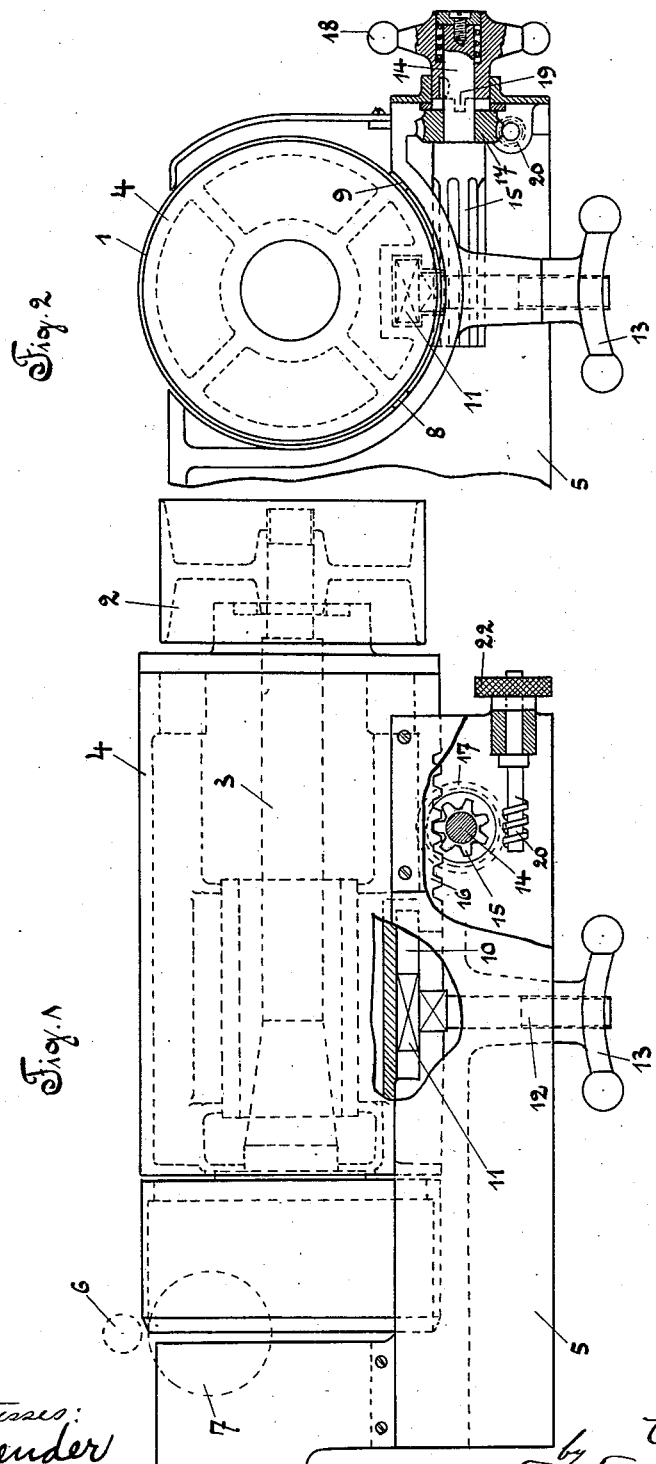

UNITED STATES PATENT OFFICE.

CARL ALBERT HIRTH, OF CANNSTATT, GERMANY.

SKIVING-MACHINE.

1,018,493.  Specification of Letters Patent.  Patented Feb. 27, 1912.

Application filed March 31, 1911. Serial No. 618,100.

*To all whom it may concern:*

Be it known that I, CARL ALBERT HIRTH, a subject of the German Emperor, and residing at Cannstatt, Germany, have invented a certain new and useful Improvement in Skiving-Machines, of which the following is a specification.

This invention relates to an improvement in skiving machines especially intended for cutting leather.

In skiving machines having annular cutters it is usual to mount the cutter shaft so as to take its bearings in the frame of the machine. This arrangement has the disadvantage that the cutters are not easily accessible and cannot be readily changed owing principally to the auxiliary appliances that operate in conjunction with the cutter. Another disadvantage is that when the cutter is temporarily changed, as is necessary when harder material has to be cut with a stronger cutter, the cutters do not run perfectly true. According to the present invention these defects are obviated by mounting the shaft of the cutter in a separate holder or body which is removably attached to the machine. Preferably the holder is provided with adjusting mechanism whereby the cutter may be adjusted relatively to the work feeding device. Thus by exchanging one holder for another any number of cutters may be used in succession without any fear of them not running true. At the same time the cutters are readily accessible which facilitates the replacing of worn cutters, and further, the cutters may be adjusted with greater precision than when they have their bearings in the frame or body of the machine.

In the accompanying drawings, which illustrate, by way of example, one construction of holder for the cutter according to this invention:—Figure 1 is a front elevation partly in section of the holder and part of the frame of the machine; Fig. 2 is an end view of Fig. 1 looking on the cutter.

The shaft 3 carrying the annular cutter 1 and the driving pulley 2, is mounted, according to the invention, in a holder or body 4, which is placed as a separate part on the frame 5 of the machine. The holder 4 is cylindrical and is the same diameter as the annular cutter, an arrangement presenting the advantage that the work, which is moved forward against the cutter by the feed device—for example, a pair of rollers 6, 7— can be moved smoothly over the cutter and the holder 4.

The holder 4 rests on two ribs 8, 9, of the frame 5 of the machine, and is prevented from rotating by the square head 11 of a bolt 12 lodging in a longitudinal groove 10 of the holder. On tightening the hand nut 13 provided on the bolt 12, the holder 4 is drawn tightly against the ribs 8, 9, by means of the head 11, so that it can be secured in any desired position.

To enable the holder and with it the annular cutter 1, to be adjusted with regard to the feed device, a pinion 15, secured to a spindle 14, is mounted in the frame 5 of the machine, the said pinion gearing with rack teeth 16 provided in the holder. A worm wheel 17, mounted loosely on the shaft 14, engages with a worm 20 adapted to be operated by a thumb screw 22, while a handle 18 is displaceably, but not rotatably, mounted on the spindle 14 by means of a groove and spring, and is adapted to engage with and release the worm wheel by means of a claw 19. The coarse adjustment of the holder 4 and annular cutter 1 is effected by loosening the nut 13, pulling the handle 18 outward and turning the spindle 14 and pinion 15 by means of said handle. For the purpose of fine adjustment, the handle 18 is first pushed inward so that the claw 19 effects the coupling of the handle with the worm wheel 17, whereupon the cutter can be accurately adjusted by means of the hand wheel 22, this operation being followed by tightening up the holder 4 by means of the nut 13. If the nut 13 be now loosened, and the holder 4 moved by means of the handle 18, pinion 15, until the head 11 issues from the longitudinal groove 10, the body can then be conveniently removed from the frame of the machine, to be examined and cleaned, or to enable the annular cutter to be removed.

What I claim is:—

1. In skiving machines the combination of an annular rotary cutter, a holder or carrier in which said cutter is rotatably mounted, means for supporting said holder so that the axis of the cutter is parallel to the direction of movement of the work and means whereby said holder may be readily attached to or removed from the said supporting means.

2. In skiving machines the combination of an annular rotary cutter, a holder or carrier in which said cutter is rotatably mounted, means for supporting said holder so that the axis of the cutter is parallel to the direction of movement of the work, means whereby said holder may be readily attached to or removed from the said supporting means and means for adjusting said cutter to and from the work in the direction of its cutting edge.

3. In skiving machines the combination of an annular rotary cutter having a spindle, a holder or carrier, bearings in said holder or carrier; said spindle being mounted in said bearings, a pulley on said spindle, means for supporting said holder so that the axis of the cutter spindle is parallel to the direction of movement of the work, means whereby said holder may be readily attached to or removed from the said supporting means and means for adjusting said cutter to and from the work in the direction of its cutting edge.

4. In skiving machines the combination of an annular rotary cutter having a spindle, a cylindrical holder or carrier, bearings in said cylindrical holder in which said spindle is mounted, means for supporting said cylindrical holder so that the axis of the cutter spindle is parallel to the direction of movement of the work, means whereby said holder may be readily attached to or removed from the said supporting means and means for adjusting said cutter to and from the work in the direction of its cutting edge.

5. In skiving machines the combination of a rotary annular cutter, a cylindrical holder in which said cutter is rotatably mounted, said cylindrical holder being substantially the same diameter as the cutter and having a longitudinal undercut groove, a support having a semi-cylindrical recess to accommodate the cylindrical holder, and a bolt and nut, said bolt having a square head adapted to enter the undercut groove in the holder whereby the holder may be clamped to the support and means for adjusting said holder relatively to the work.

6. In skiving machines the combination of a rotary annular cutter, having a spindle, a cylindrical holder in which said spindle is rotatably mounted, said holder being substantially the same diameter as the cutter, a support, means for removably attaching the holder to the support and means for adjusting the position of the holder on the support relatively to the work.

7. In skiving machines the combination of a rotary cutter, a holder or carrier in which said cutter is rotatably mounted, means whereby said holder or carrier may be readily attached to or removed from the machine, means for effecting a quick or coarse adjustment of the cutter relatively to the work in one direction and means for effecting a slow or fine adjustment of the holder relatively to the work in the same direction.

8. In skiving machines the combination of a rotary annular cutter, a holder or carrier in which said cutter is rotatably mounted, means for supporting said holder so that the axis of the cutter is parallel to the direction of movement of the work, a rack on said holder, a pinion gearing with said rack, a spindle on which said pinion is mounted, a hand wheel on said spindle whereby said holder may be moved to or from the work in the direction of the cutting edge of the cutter and means whereby said holder may be readily attached to or removed from said supporting means.

9. In skiving machines the combination of a rotary annular cutter having a spindle, a cylindrical holder or carrier, bearings in said cylindrical holder in which said spindle is mounted said cylindrical holder being substantially the same diameter as the cutter, a support on said machine, means whereby said cylindrical holder or carrier may be readily attached to or removed from said support, a rack on said cylindrical holder, a pinion gearing with said rack, a spindle on which said pinion is mounted and a hand wheel mounted on said spindle whereby the latter may be rotated to effect a quick adjustment of the holder relatively to the work.

10. In skiving machines the combination of a rotary cutter, a holder in which said cutter is rotatably mounted, means for removably attaching said holder to the frame of the machine, a rack on said holder, a pinion gearing with said rack, a spindle on which said pinion is mounted, a hand wheel free to slide but not rotate on said spindle and having a claw, a worm wheel loosely mounted on said spindle and having a recess, said claw being adapted to enter the recess in the worm wheel in order to lock it to the spindle, a worm gearing with said worm wheel and having a spindle and a thumb screw rigid on said worm spindle whereby the latter may be rotated to effect the slow or fine adjustment of the holder relatively to the work.

In witness whereof I have hereunto set my hand in the presence of two subscribing witnesses.

CARL ALBERT HIRTH.

Witnesses:
ERNEST ENTENMANN,
ERT. JUNGHAUS.

Copies of this patent may be obtained for five cents each, by addressing the "Commissioner of Patents, Washington, D. C."